M. BALCKER.
VARIABLE SPEED FRICTION DRIVE.
APPLICATION FILED JAN. 26, 1921.
1,416,158.
Patented May 16, 1922.
2 SHEETS—SHEET 2.
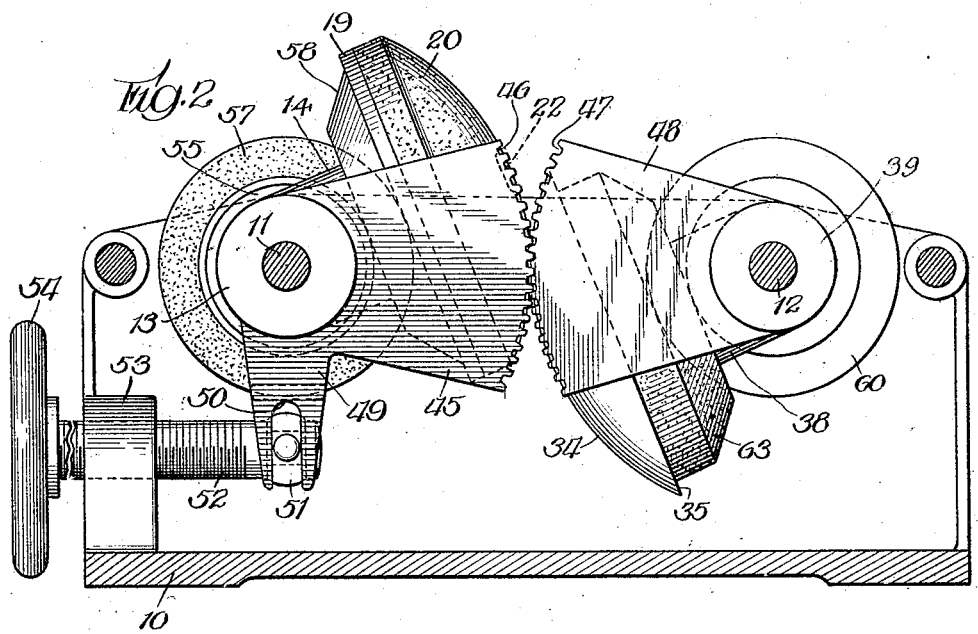
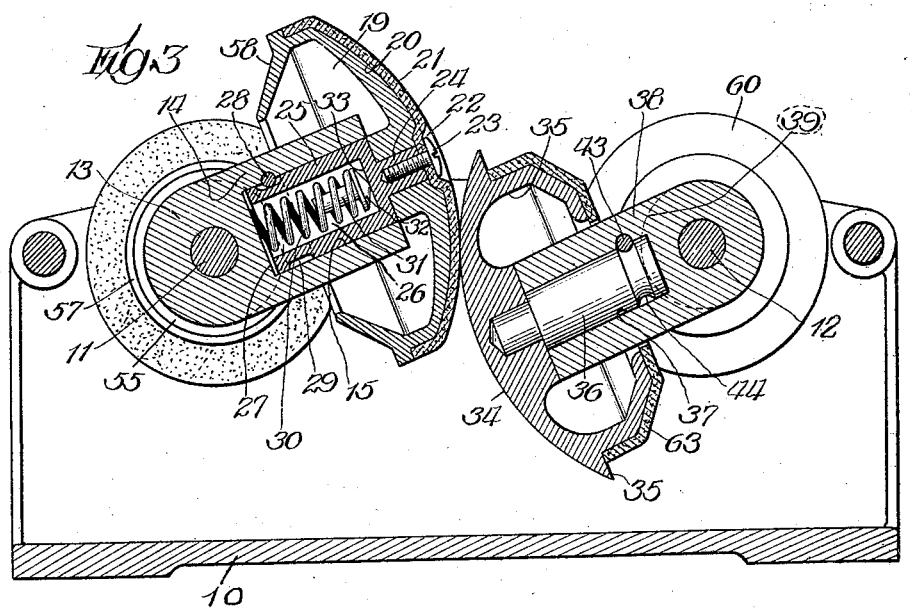
Inventor
Martin Balcker
By J. A. Jochum Atty

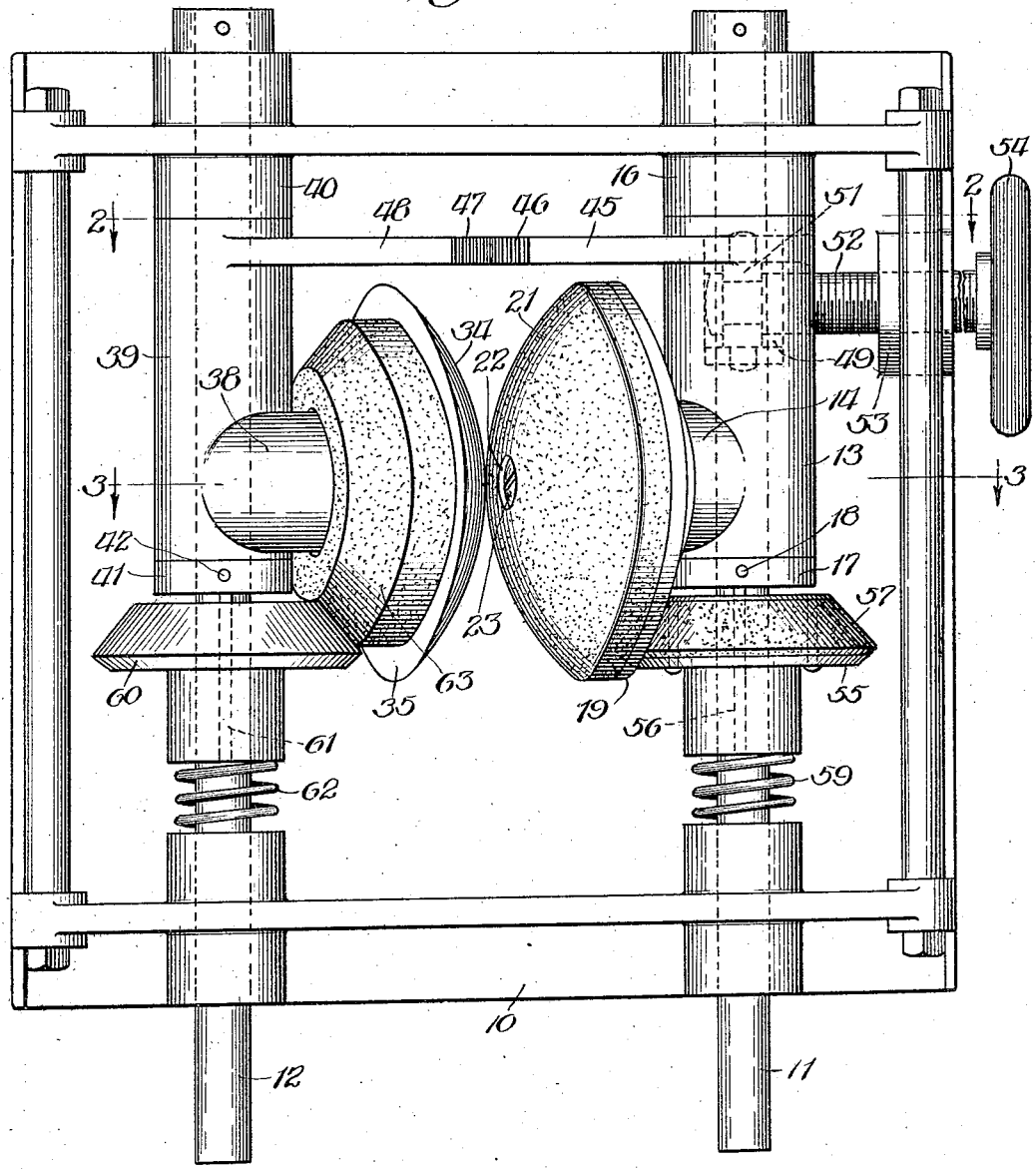

UNITED STATES PATENT OFFICE.

MARTIN BALCKER, OF CHICAGO, ILLINOIS, ASSIGNOR TO JOHN NELSON, OF CHICAGO, ILLINOIS.

VARIABLE-SPEED FRICTION DRIVE.

1,416,158.	Specification of Letters Patent.	Patented May 16, 1922.

Application filed January 26, 1921. Serial No. 440,048.

*To all whom it may concern:*

Be it known that I, MARTIN BALCKER, a citizen of the United States, residing at Chicago, in the county of Cook and State of Illinois, have invented certain new and useful Improvements in Variable-Speed Friction Drives, of which the following is a specification.

This invention relates to improvements in variable speed friction drive, and one of the objects of the invention is to provide co-operating rotatably mounted friction elements adapted to be brought into contacting and co-operating engagement, the surfaces of the elements being convex or of a semispherical configuration, the surface of each element being formed on a radius described from the pivotal center of the respective elements, and the elements being mounted with respect to each other that their active surfaces will be brought into engagement and shifted with respect to each other by a rolling or pivotal movement, thereby overcoming or obviating a sliding contact of the friction surface with each other.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 1 is a top plan view.

Figure 2 is a sectional view taken on line 2—2, Figure 1.

Figure 3 is a sectional view taken on line 3—3, Figure 1.

In the specification and claims the movement of the friction surfaces with respect to each other will be described and claimed as a contacting rolling movement, but it is to be understood that this term or expression is to be construed to cover any movement of one of the elements with respect to the other whereby the friction surfaces will not be given a sliding movement one with relation to the other.

Referring now more particularly to the drawing the numeral 10, designates any suitable supporting structure having journaled therein in suitable bearings a driving shaft 11, and a driven shaft 12, which are preferably arranged parallel with each other. The driving shaft receives its motion from any suitable source, not shown.

Mounted loosely upon the shaft 11, is a sleeve 13, which is provided with a bearing portion 14, having a recess 15, opening through the end thereof, and this sleeve is held in position in any suitable manner preferably by one end thereof abutting the bearing 16, and a collar 17 abutting the other end of the sleeve and which collar is in turn held in position by means of a suitable fastening device 18, so that the sleeve 13 will have a free pivotal or swinging movement about the shaft 11.

Carried by the bearing member 14, is a friction element 19, having a convexed surface 20, and which surface is preferably provided with a fibrous covering 21, held in position in any suitable manner. The central portion of the convex surface of the element 19, is recessed as at 22, for a purpose to be hereinafter set forth and the covering 21 is drawn into the recess by means of a suitable fastening device 23, such as a screw or the like and which fastening device enters the extremity 24, of a hub 25, which is connected with the element 19. In the present form of the invention this hub 25, is shown as being separate from the element 19, and secured thereto by the fastening device 23, but, it is to be understood that if desired the hub and element 19, may be formed integral.

The hub 25, is provided with a recess 26, opening through the end thereof and the hub 25, enters the recess 15, to telescope with the bearing member 14, the open end of the recess 26, being opposed to the bottom 27, of the recess 15. The element 19, is held against accidental displacement with respect to the bearing 14, in any suitable manner but preferably by means of a pin or fastening device 28, which passes through a portion of the bearing member 14, and enters a circumferential recess or groove 29, in the periphery of the hub 25. This opening or groove 29, is of a width somewhat greater than the diameter of the pin or fastening device 28, so as to permit the hub 25 and the friction element 19, to have a slight movement longitudinally with respect to the bearing 14.

Arranged within the opening 26 in the hub is an elastic member 30, preferably in the form of a coil spring, one end of which rests upon the bottom 27 of the recess 15, and other end preferably encompasses a stem 31, of a conical bearing member 32, and which conical bearing member 32, engages and rests against the bottom 33, of the recess 26, in the hub 25. The spring 30, serves the purpose of holding the friction element 19, in slight yielding contact with the surface 34, of the co-operating friction element 35. The element 35, is provided with a hub 36, which projects into a recess 37, in a bearing member 38, carried by a sleeve 39, and which sleeve 39, is loosely mounted upon the shaft 12. The sleeve is held against movement longitudinally of the shaft in any suitable manner preferably by means of one end of the sleeve abutting the bearing 40, and a collar 41 abutting the other end of the sleeve and which collar 41, is held in position by a fastening device 42.

The surface 20, of the element 19 and the surface 34 of the element 35, are convexed and are formed on radii described from the centers of the respective shafts 11 and 12, and as the sleeves 13—39 are rocked about their respective shafts in a manner to be hereinafter set forth, the faces 20 and 34 of the friction elements will be moved over each other with a rolling or rocking movement so that the friction engaging surface will not have a sliding contact against each other.

The element 35, is held against displacement with respect to the bearing 38, preferably by means of a pin 43, passing into the element 38, and entering a circumferential groove 44, in the hub 36.

Any suitable means may be provided for rocking these elements about their pivots. A simple and efficient means for accomplishing that result embodies a segment 45, which is connected with the sleeve 13, and is provided with teeth 46. These teeth 46 mesh with teeth 47, of a segment 48, which is connected with the sleeve 39. An arm 49, is connected with the sleeve 13, and is provided with a bifurcated portion 50, in which a bearing member 51, operates. Connected with this bearing member 51, is a threaded shaft 52, which passes through a bearing 53, and is provided with a handle 54, by means of which the shaft may be rotated.

It will thus be seen that when the handle 54, is operated to rotate the shaft 52, the latter will be advanced or retracted through the bearing 53, and with such movement will, through the medium of the bearing 51, actuate the arm 49, to rock the segment 45. This segment 45, is operatively connected with the segment 48, through the intermeshing teeth 46—47, and as the segments are connected with the respective sleeves carrying the respective friction elements, it will be clearly seen that these friction elements will be rocked about their pivots and the friction engaging surfaces will be rocked or rolled against or across each other.

The threaded shaft 52, also serves as a means for maintaining the friction elements in their relatively adjusted positions.

The recessed portion 22, at the center of the friction surface 20 will, when the elements are adjusted in one direction, and when the elements assume a predetermined position, stand adjacent a portion of the friction surface 34, so that there will be no frictional contact between the surfaces and this will stop the rotation of the element 35, connected with the driven shaft 12.

Motion may be imparted to these elements in any manner preferably by means of a pulley 55, which is keyed as at 56 with the driving shaft 11. This pulley 55, is provided with a fibrous covering or face 57, such as leather, canvas or the like and contacts with the face 58, of the element 19, and an elastic member 59, such as a spring or the like tends normally to hold the surface 57 of the pulley 55, in frictional contact with the face 58.

A similar pulley 60, is keyed as at 61, with the driven shaft 12, and an elastic member such as a spring 62, tends normally to hold the face of the pulley 60, against a fibrous covering 63, such as leather, canvas or the like on the element 35, and this pulley 60 and shaft 12, are rotated from the element 35, through the medium of the element 19.

With this improved construction it will also be manifest that the friction elements 19—35 are also adapted for rotation on axes transverse to the axes of their pivots and by reason of the elastic member 30, the friction surfaces will be held in yielding contact.

Furthermore, it will be manifest that the speed of rotation of the driven shaft 12, with respect to the driving shaft 11, may be readily varied by operating the handle 54, of the shaft 52, to swing the friction elements 19—35 about their pivots.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A variable speed friction drive mechanism embodying a driving and a driven shaft, two co-operating rotatable friction drive elements pivotally mounted upon the respective shafts and adapted to be shifted with a rolling contact of the active faces of the elements with each other as distinguished from a sliding movement of the friction surfaces against each other, said elements being simultaneously movable about their pivots whereby the position of the said elements with respect to each other and the respective shafts may be varied while the position of the shafts with relation to each other remains constant.

2. A variable speed friction drive mechanism embodying a driving shaft, a driven shaft, two co-operating pivotally mounted friction drive elements adapted to be shifted with a rolling contact of the active faces of the elements with each other for varying the position of the said elements with respect to each other and with relation to the respective shafts while the position of the shafts with respect to each other remains constant, and means for controlling at will the extent of such rolling movement.

3. A variable speed friction drive mechanism embodying two co-operating pivotally mounted and rotatable friction drive elements adapted to be shifted with a rolling contact of the active faces of the elements with each other as distinguished from a sliding movement of the friction surfaces against each other, one of the said elements being provided with a recess at the central portion thereto to render the elements inactive with relation to each other.

4. A variable speed friction drive mechanism embodying two co-operating pivotally mounted and rotatable friction drive elements adapted to be shifted with a rolling contact of the active faces of the elements with each other, means for controlling at will the extent of such rolling movement, the said means embodying intermeshing toothed segments operatively related to the first recited elements, and means for actuating the said segments.

5. A variable speed friction drive mechanism embodying co-operating pivotally mounted and rotatable friction elements adapted to be shifted by a rolling contact of the active faces of the elements with each other, the said surfaces being convexed and formed on radii described from the respective pivotal centers of the elements.

6. A variable speed friction drive mechanism embodying co-operating pivotally mounted and rotatable friction elements adapted to be shifted by a rolling contact of the active faces of the elements with each other, the said surfaces being convexed and formed on radii described from the respective pivotal centers of the elements, and means operating to simultaneously move the said elements about their pivots.

7. A variable speed friction drive mechanism embodying co-operating pivotally mounted and rotatable friction elements adapted to be shifted by a rolling contact of the active faces of the elements with each other, the said surfaces being convexed and formed on radii described from the respective pivotal centers of the elements, and means for simultaneously moving the said elements about their pivots, the said means also operating to maintain the elements in their shifted positions.

8. A variable speed friction drive mechanism embodying a driving and a driven shaft, two co-operating rotatable convex friction drive elements each mounted for bodily pivotal movement upon one of the shafts, said elements being adapted to be shifted with a rolling contact of the active faces of the friction elements with each other as distinguished from a sliding movement of the friction surfaces against each other, said elements being simultaneously movable in the same direction and between the pivots whereby the position of the elements with respect to each other and with relation to the respective shafts may be varied at will while the position of the shafts remains constant, the axes of rotation of the said elements being transverse to the axes of their respective pivots.

9. A variable speed friction drive mechanism embodying two co-operating pivotally mounted and rotatable convex friction drive elements adapted to be shifted with a rolling contact of the active faces of the friction elements with each other, the axes of rotation of the said elements being transverse to the axes of their respective pivots, and means adapting one of the said elements for a yielding movement in a direction radially with respect to its pivot.

10. A variable speed friction drive mechanism embodying a driving shaft, a driven shaft, two co-operating pivotally mounted friction drive elements adapted to be shifted with a rolling contact of the active faces of the elements with each other for varying the position of the said elements with respect to each other and with relation to the respective shafts while the position of the shafts with respect to each other remains constant, and a fibrous covering for one of the said active faces.

11. A friction drive mechanism embodying a pivotally mounted support having a bearing therein, a convex friction disc, a hollow hub connected with the disc and telescoping with the said bearing, said hub having an opening through one end thereof, means connecting the hub for rotation with respect thereto and also for a relative and limited longitudinal movement, and an elastic element interposed between the said hub and the bearing.

12. A friction drive mechanism embodying a pivotally mounted support having a bearing therein, a convex friction disc, a hollow hub connected with the disc and telescoping with the said bearing, said hub having an opening through one end thereof, means connecting the hub for rotation with respect thereto and also for a relative and limited longitudinal movement, and an elastic element interposed between the said hub and the bearing, the said elastic element being seated within the hub and having a bearing against the first recited bearing.

13. A friction drive element embodying a pivotally mounted bearing having an open recess, a convex friction element, a hub connected with the element and having a recess opening through one end thereof, said hub telescoping with the said bearing, means connecting the hub with the bearing for rotation with respect thereto and also for a relative longitudinal movement, an elastic element housed within the hub and bearing, and a conical bearing element arranged at one end of the elastic element, said conical element having a bearing against one of the walls of the recess in one of the elements and the other end of the elastic element having a bearing against the opposite wall of the recess in the other element.

14. A friction drive mechanism embodying a driving shaft, a driven shaft, two contacting convex friction surfaces connected with the shafts, and means whereby the position of the elements with respect to each other and with relation to the respective shafts may be varied while the position of the shafts remains constant.

15. A friction drive mechanism embodying two pivotally mounted and contacting convex friction surfaces, and means for swinging the elements about their pivots, one of the said surfaces having a concavity at the center thereof.

In testimony whereof I have signed my name to this specification, on this 20th day of January, A. D. 1921.

MARTIN BALCKER.